United States Patent Office 3,525,694
Patented Aug. 25, 1970

3,525,694
MAGNETIC RECORDING MATERIAL

Johann H. Bisschops, Berchem, Willy K. Van Landeghem, Sint-Gillis-Waas, and Romain H. Bollen, Hove, Belgium, assignors to Gevaert-Agfa N.V., Mortsel-Belgium, a Belgian company No Drawing. Filed Aug. 30, 1967, Ser. No. 664,304
Claims priority, application Great Britain, Aug. 30, 1966, 38,553/66
Int. Cl. H01f *1/26*
U.S. Cl. 252—62.54 6 Claims

ABSTRACT OF THE DISCLOSURE

Magnetic recording material having improved abrasion resistance under repeated reuse is obtained by incorporating a minor amount of petrolatum in the recording layer containing magnetically susceptible particles dispersed in an appropriate binder.

The present invention relates to improved magnetic recording material, more particularly to magnetic recording material with improved resistance to wear.

Commonly used magnetic recording materials are manufactured in the form of a tape comprising a non-magnetic base whereto magnetic particles dispersed in a non-magnetic binder are applied.

Magnetic recording media for use in recording at high speed, e.g. in a magnetic tape transport unit used in data storage or video recording, are subjected to wear in consequence of intensive friction during the tape transport. As a result of the wear loose particles can deposit onto the tape surface or adhere to the parts of the tape transport unit in contact with the tape. These loose particles can agglomerate to lumps and give rise to a loss of signal or "drop-outs."

Some of magnetic recording materials can contain binders that yield a high resistance to abrasion such as, e.g., hardened elastomeric polyurethane resins. The resistance to abrasion can, however, be improved yet with a lubricating agent making part of the recording material.

Many lubricating agents have been proposed already for that purpose, e.g., fatty acid esters (see e.g. United Kingdom patent specification 1,009,774). In order to obtain a sufficient lubricating effect, those materials have to be used in such amounts that they soften the magnetic recording layer thereby decreasing its scratch resistance, and/or exude from the recording layer. When exuding from the recording layer they cause undesirable layer-to-layer adhesion while the tape is wound on reels. Also a detrimental transfer of dust or abraded particles from coating to back or vice-versa can occur. Further it has been established in connection with said lubricants that frequently repeated passing of the recording tape on the same coating area can give rise to a local accumulation of lubricant and to a strong increase of the friction coefficient.

It is an object of the present invention to provide a self-lubricating magnetic coating with improved resistance to wear wherein the lubricant applied does not show the disadvantages cited of known lubricated magnetic coatings.

It has been found that said object can be accomplished by the use of a hydrocarbon compound mixture known as Vaseline or petrolatum making part of the magnetic recording material preferably incorporated into the magnetic recording layer composition.

Petrolatum or Vaseline petroleum jelly is a purified mixture of semisolid hydrocarbons obtained from the petroleum fraction boiling above 280° C. as a jelly-like mass, soluble in benzene. Common Vaseline is partially soluble in absolute alcohol, diethyl ether and chloroform. Vaseline mainly comprises hydrocarbon fractions of $C_{20}$ to $C_{22}$ with a melting point of 38–55° C. In the present invention the Vaseline melting in the range of 34 to 54° C. is preferably used.

The most interesting result of the application of the Vaseline in the magnetic recording layer containing magnetically susceptible particles dispersed in a binder, lies in the particularly high increase of abrasion resistance on friction of the same area of the recording layer and the very low exudation of the compound from the coating, which makes it very suited for use in computer tape and video recording tape, particularly for heavy duty performance.

The Vaseline is not used in an amount so high as is common for a binder. According to a preferred embodiment the Vaseline is used in combination with a binder wherein it readily can be dispersed and preferably dissolved (solid state solution). The binder is selected from the class of binders that strongly bind the magnetic layer to its support so that it is non-transferable or releasable, e.g., by pressure in other words the binder may not be a wax or of the waxy and pressure-disruptable type.

Pressure-transferable magnetic pigment coatings containing petrolatum for the purpose of producing a frangible binder are described in the U.K. patent specifications 683,505 and 1,007,278.

According to a particularly preferred embodiment of the present invention the Vaseline is used in an amount of 0.2 to 5% by weight in respect of the magnetically susceptible particles more preferably in a ratio of 0.5 to 2% by weight. The Vaseline can be readily dispersed or dissolved in the usual binders of the magnetic recording coating.

In practice the use of fractions of Vaseline which are soluble at room temperature (20° C.) or coating temperature in the particular solvent or solvent mixture wherein the binder is soluble, e.g., chlorinated hydrocarbons such as dichloroethane, ketone compounds such as methyl ethyl ketone and ethers such as tetrahydrofuran, is preferred. These Vaseline fractions are preferably applied in the same ratio by weight in respect of the magnetically susceptible material as stated above for the non-extracted Vaseline. Such fractions soluble in the solvent or solvent mixture used for applying the recording layer can easily form a solid homogeneous mixture with an appropriate binder and consequently are very suited for the production of a lubricated coating.

In that respect the attention has to be drawn to the disadvantages of paraffin oil and paraffin wax. Paraffin oil being a liquid at room temperature and having a boiling point near 300° C. exudes from the recording layer and when used in recording layers the binder of which has to be cured at more elevated temperatures evaporates during the curing step. The paraffin wax being a brittle solid at room temperature is insufficiently compatible with the binder and therefore is very inhomogeneously distributed in the recording layer and at its surface, so that lubrication is discontinuous.

In common practice the Vaseline is added to the composition of the recording layer but can also be applied in a top-coat thereto preferably dissolved in an appropriate binder.

According to a preferred technique the lubricant is mixed, e.g. in a ball-mill, with the powdered magnetic material and a dispersing agent therefor in a suitable solvent. In that mixture the binding agent is dissolved. The coarse particles left after the grinding are removed and the composition is deaerated before coating it onto a support.

Suitable solvents for use in the coating of the recording layer are, e.g., relatively volatile aromatic hydrocarbons or chlorinated hydrocarbons such as 1,2-dichloroethane. Suitable binders for magnetic recording layers are, e.g., polyvinyl chloride, copolymers of vinylidene chloride and acrylonitrile, polyvinyl acetate, polyacrylic acid esters, such as polybutyl acrylate, copolymers of vinyl alcohol with vinyl acetate, vinylbutyral, vinyl chloride or vinylidene chloride, different classes of polyurethanes and isocyanate-modified polyesters and polyester amides, e.g., the binders described in the U.K. patent specifications 991,676, 1,058,425, 1,058,426 (being published Dutch patent applications 273,831, 294,678 and 6511015 respectively), 982,665 and 1,006,140.

The magnetic coating preferably contains 65 to 85% by weight of magnetic powder. The binder has a more or less flexible character according to the use for which the recording material is intended.

Elastomers, which can be hardened to some extent, are preferred for the manufacture of the magnetic coating of recording tapes. Curing improves the wear resistance and calendering improves the smoothness of the coating and packing of the magnetic material.

Any of the usual magnetic particles may be used in the recording elements of the invention, e.g., magnetically susceptible iron oxide particles, magnetite, chromium dioxide ($CrO_2$), ferromagnetic metal particles and alloys and mixed ferrites. The preferred particles are of the oxidic type, are elongated or acicular in shape, e.g., acicular $\gamma$-$Fe_2O_3$, and are preferably from 0.2 to 2.0 micron long and from 0.02 to 0.6 micron wide.

Flexible as well as rigid bases can be used as supports. The base may have any geometrical form e.g. it may be in the form of a disc, drum or tape, and may be made of any convenient material such as glass, plastic or metal. A preferred base material is made of oriented polyethylene terephthalate film.

Other suitable bases are made of paper, cellulose triacetate, and oriented polyvinyl chloride. The base may have any thickness according to the use for which the recording material is intended, for recording tape the base has normally a thickness of 0.01 mm. to 0.06 mm. The base may be of any width, for example between 6 mm. and 60 mm. and of any length.

The following examples illustrate the present invention without however limiting it thereto.

The indicated parts are parts by weight.

EXAMPLE 1

A mixture comprising the following ingredients is ground in a ball mill for 48 hours:

100 parts of needle-shaped $\gamma$-$Fe_2O_3$
4 parts of a dispersing compound prepared according to preparation 1 of the Great Britain patent specification 1,058,426 as described below
12.5 parts of partially hydrolyzed copoly(vinyl chloride/vinyl acetate) comprising 2.3% of free hydroxyl groups and 3% of vinyl acetate groups
2 g. of a Vaseline having a melting range of 35–45° C., and a viscosity of 45 cps. of 50° C.
200 parts of 1,2-dichloroethane.

The following products are added to this mixture:

10.5 parts of polyester amide modified with a poly-isocyanate resulting from the reaction of 4 parts of hexamethylene disocyanate with 100 parts of a polyesteramide, which is prepared by condensing 7.5 moles of ethylene glycol, 9 moles of adipic acid and 1.5 mole of ethanolamine, 125 parts of 1,2-dichloroethane.

Grinding is continued for 24 hours. A mixture of 6 parts of a 75% solution of the reaction product of 1 mole of 1,3,6-hexanetriol and 3 moles of hexamethylene diisocyanate in 1,2-dichloroethane is added to the above composition.

The resulting composition is applied to a polyethylene terephthalate support and dried and hardened thereon at 120° C. The thickness of the dry recording layer is 10$\mu$.

The obtained recording tape was tested as to its resistance to wear on a tape tester (Potter-model 3320–1001–7 of Potter Instrument Co. Inc., Plainview, N.Y., U.S.A.). The tape tester is arranged as to be able to test a short length of tape automatically (2 m. in this experiment). One cycle of recording, playback and rewinding is called a "pass." The number of passes the tape can perform without a permanent drop-out is taken as a measure of the resistance to wear. In this experiment a drop-out is defined as a loss of signal level of more than 50% at a bit density of 800 bits per inch.

The tape prepared according to the present example was resisting more than 150,000 "passes" before one drop-out was detected.

Preparation 1 as referred to above is prepared in the following manner:

An amount of 6000 gm. of polyester resulting from the condensation of 2.5 mole of adipic acid, 0.5 mole of orthophthalic acid and 4 moles of trimethylolpropane and characterized by a hydroxy content of 9% by weight, a water content lower than 0.15% and a viscosity at 75° C. of 3000 cps., is dried in vacuo (10 mm. Hg) for 2 hours at 120° C. To the dried polyester are added 1644 gm. of diethyl phosphite and 1.2 gm. of zinc acetate as a catalyst. The reaction mixture is then heated to 170° C. for 3 hours while stirring and while 800 ccs. ethanol are distilled off during this period.

Next the reaction mixture is placed in vacuo for 30 minutes in order to collect non-reacted diethyl phosphite from the highly viscous final product.

The determination of the acid proportion of the final product by potentiometric titration yields 0.75 milliequivalent per gram. The proportion of unesterfied hydroxyl groups is 25%.

EXAMPLE 2

The tape prepared as described in the foregoing example is tested on abrasion in a "slant track" video recorder (Philips Medical Video Recorder EL 3400). In snch an apparatus a revolving head helically scans the tape at 50 revolutions per second.

The tape was tested by reproducing a so-called "still-picture," which was formed by repeatedly reproducing the information contained in one track corresponding to one "field" (non-interlineated TV image).

When operating in this way, it usually lasted no longer than 15 to 20 seconds before the picture on the television screen faded.

It was possible to use the tape for 1 hour in "still-picture" reproduction, without any perceptible reduction in quality.

EXAMPLE 3

Example 1 is repeated with the proviso however that in the composition of the recording layer particles of an iron-nickel-cobalt (45/5/50) alloy of an average size of 30 m$\mu$ ore substituted in a same weight for the $\gamma$-$Fe_2O_3$ particles.

The tape of the present example withstands also more than 150,000 "passes."

What we claim is:

1. A magnetic recording material comprising a non-pressure-transferable coating containing about 65–85% by weight of powdered magnetically susceptible material dispersed in a binder, and about 0.2–5% by weight of said material of petrolatum as lubricant for the improvement of the abrasion resistance of said coating, said binder being a synthetic polymer of the group consisting of polyvinyl chloride, copolymers of vinylidene chloride and acrylonitrile, polyacrylic acid esters, copolymers of vinyl alcohol and vinyl acetate, vinyl butyral, vinyl chloride or vinylidene chloride, polyurethane, and isocyanate-modified polyesters or polyesteramides, and said petrolatum being generally uniformly distributed within said coating.

2. A magnetic recording material according to claim 1, wherein said petrolatum is a hydrocarbon mixture melting between 34 and 54° C.

3. A magnetic recording material according to claim 1, wherein the magnetically susceptible particles are metal oxide, pure metal, metal alloy or ferrite particles.

4. A magnetic recording material according to claim 1, wherein the magnetically susceptible particles are $\gamma$-$Fe_2O_3$ particles, $CrO_2$ particles or iron-nickel-cobalt (45/5/50) alloy particles.

5. A magnetic recording material according to claim 1, wherein the lubricant is present in a coating containing an isocyanate-modified polyester or polyester amide.

6. A magnetic recording material according to claim 1, wherein the coating is applied onto a flexible base and forms a tape for heavy duty magnetic recording.

References Cited

UNITED STATES PATENTS

| | | | |
|---|---|---|---|
| 3,029,157 | 4/1962 | Sutheim et al. | 117—36.1 |
| 3,144,352 | 8/1964 | Talley | 117—138.8 |

OTHER REFERENCES

Boner Manufacture and Application of Lubricating Greases, Reinhold Publishing Corp., New York, N.Y. 1954, pp. 798–9.

TOBIAS E. LEVOW, Primary Examiner

A. B. DEMPERS, Assistant Examiner

U.S. Cl. X.R.

117—160, 235, 237, 240; 252—62.51